July 28, 1925.
E. L. DUNN
1,547,306
LEVELING SWITCH APPARATUS
Filed Aug. 23, 1923
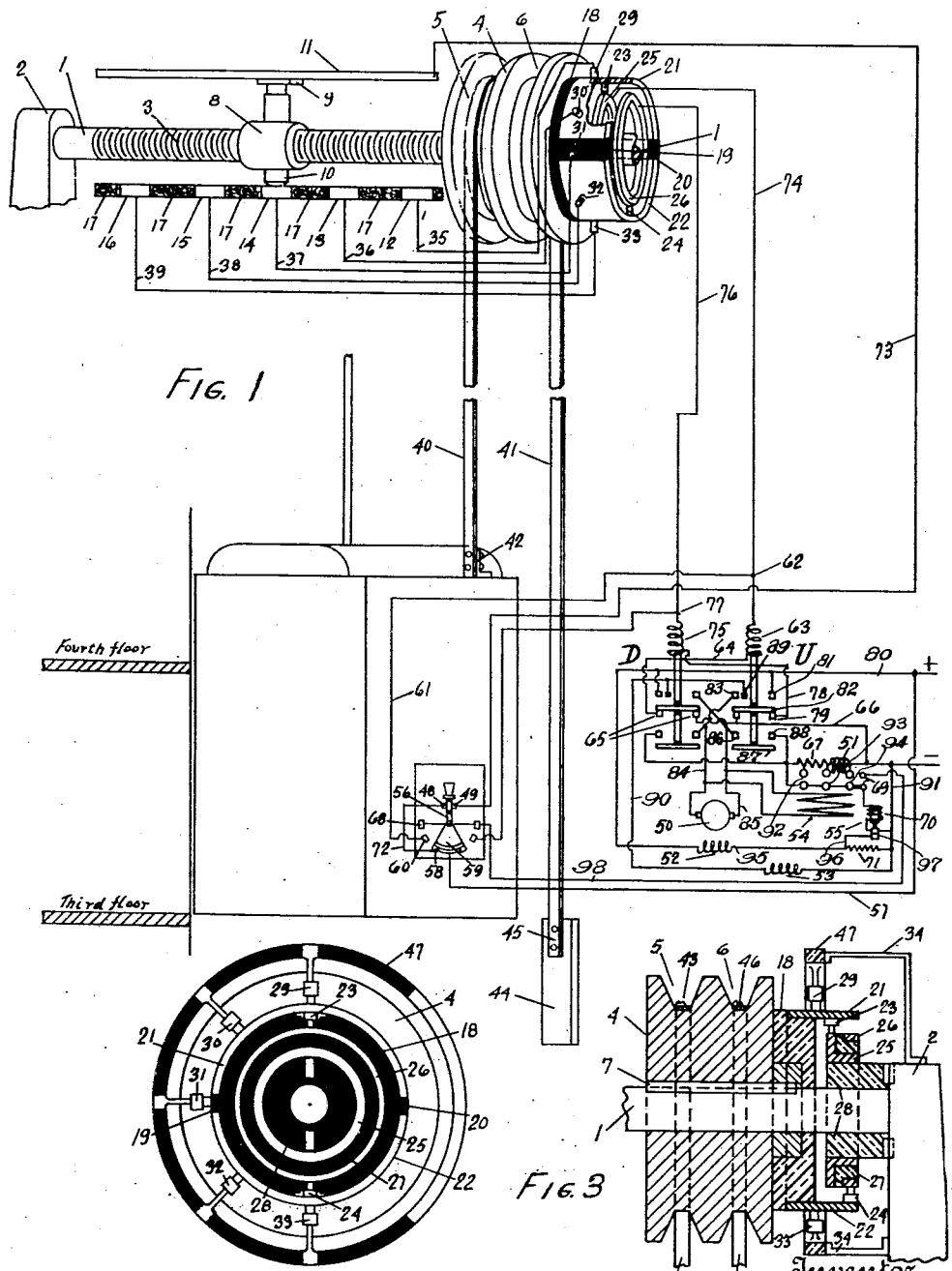

Patented July 28, 1925.

1,547,306

UNITED STATES PATENT OFFICE.

EDWARD L. DUNN, OF EAST ORANGE, NEW JERSEY, ASSIGNOR TO OTIS ELEVATOR COMPANY, OF JERSEY CITY, NEW JERSEY, A CORPORATION OF NEW JERSEY.

LEVELING SWITCH APPARATUS.

Application filed August 23, 1923. Serial No. 658,895.

*To all whom it may concern:*

Be it known that I, EDWARD L. DUNN, a citizen of the United States, residing in East Orange, in the county of Essex and State of New Jersey, have invented a new and useful Improvement in Leveling Switch Apparatus, of which the following is a specification.

My invention relates to improvements in elevator car leveling switch apparatus for controlling the movement of the elevator in the operation of leveling the car with the floor landings.

It has for its objects, more or less comprehensively stated, to provide a series of car leveling switches, one for each floor landing, directly operated by the movement of the car, and, furthermore, to provide a leveling switch apparatus that can be located in the pent house for the elevator machine or some other similar convenient place.

In electric self-leveling elevators as now installed the car leveling switch is provided with two movable switch arms, one to be moved to operate the switch for the up direction of car travel and the other arm to be moved for the down direction of car travel. The arms are adapted to be projected when desired into the path of cams located in the hatchway at the floor landings, one cam to move the switch arm for the up direction of car travel and the other cam to move the switch arm for the down direction of car travel. The arms as projected are carried by the car against and along the cams, and in that way the cams move the arms and thereby operate the car leveling switch for the control of the car during the operation of leveling the car with the landings. When the car is level with the desired landing, the switch arm corresponding to the direction last traveled by the car in the operation of leveling it with the landing is carried by the car past and out of contact with its cooperating cam, and, thereby, the switch arm for that direction of travel by the car becomes released from the action of that cam at that time. The switch upon becoming released serves to cut off the power to the hoisting motor for the car at substantially the time that the car is substantially level with the landing, and if the car is moving sufficiently slowly at that time it will stop substantially level with the landing; if, however, the car moves past the landing it will carry the switch arm for the opposite direction of car travel against its cooperative cam, and, thereby, operate the leveling switch to bring the car back to the landing.

In the art of self-leveling elevators, it is desirable that as high a degree of levelness of the car with the floor landing be attained as possible. Judged by the self-leveling elevators in practice, it appears that to achieve a high degree of levelness of the car with the landings it is highly desirable, if not actually necessary, that the car and the car leveling apparatus be directly connected in effect with each other in the operation of leveling the car with the landings or, anyway, that there be as near synchronism as practicable between the movement of the car in the operation of being leveled with the landing and the operation of the leveling apparatus in leveling the car.

In my invention I retain that greatly desired relation between the car and leveling apparatus, as found, for example, in the case of the car, leveling switch carried by the car and cams in the hatchway; in my invention, however, cams or similar devices fixed to the hatchway are not employed, and the arms on the car leveling switch movable by cams fixed in the hatchway are not used; and the leveling apparatus instead of being carried by the car is shown as not located on the car, but as being capable of being installed in some other convenient place, such for example, in the pent house of the elevator machine.

I attain the aforestated objects and other objects which will appear in the following description by the car leveling switch apparatus illustrated in the accompanying drawings, in which—

Figure 1 is a perspective view of the leveling switch apparatus applied to an elevator.

Figure 2 is an end view of a part of the leveling switch apparatus.

Figure 3 is a sectional view of a part of the leveling switch apparatus.

Similar reference numerals refer to similar parts throughout the several views.

Referring to the drawings, the leveling switch apparatus comprises a rotatable shaft 1 having its ends mounted in bearing stands 2 and having screw threads 3 on a portion of its length. A driving sheave or pulley 4 provided with grooves 5 and 6 is fixed to the shaft by a key 7, for example. A switch comprising a traveling nut 8 mounted on the threads 3 of the shaft travels thereon by the shaft rotating. The nut has brushes 9 and 10; the brush 9 moves in contact along a continuous strip 11, of conducting material and the brush 10 moves over a series of separate conducting sections 12, 13, 14, 15 and 16. There are as many separate sections as there are floors, each section being insulated from the others by insulating material 17. The length of each conducting section is proportioned to the length of the car leveling zone, which customarily extends on both sides of the floors an equal distance, and, therefore, it is usual to arrange the conducting sections so that when the car is level with a floor the brush 10 is at the center of the conducting section corresponding to that floor. There is another switch comprising a drum 18 of insulating material mounted fast on the shaft by the key 7. The drum 18 carries two conducting members 21 and 22 on its periphery. Between the ends of these are the two parts 19 and 20 of the drum. One of the members, 21 for example, is for the up direction of car travel and the other for the down direction of travel. There are contact brushes 23 and 24 affixed to the internal periphery of members 21 and 22 respectively, and they make contact with stationary conducting rings 25 and 26 respectively. The ring 25 is mounted on a bushing 28 of insulating material which is fixed to a bearing stand 2; the ring 25 is insulated from the ring 26 by a ring 27 of insulating material. Stationary brushes 29, 30, 31, 32 and 33, one for each floor, are mounted on a ring 47 of insulating material which is held by arms 34 fixed to a bearing stand 2. The members 21 and 22 are adapted to be rotated in contact with the stationary brushes 29 to 31 inclusive. Conductor wires 35, 36, 37, 38 and 39 connect the conducting sections 12, 13, 14, 15 and 16 with the stationary brushes 29, 30, 31, 32 and 33 respectively. When the car is level with a floor the stationary brush for that floor is on the insulating part 19, and not on either one of the conducting members 21 or 22. The car is never stopped with a brush on the other insulating part 20; that part is used merely to fill in the space between those ends of the segments and preferably is flush with the exterior surface of the conducting members 21 and 22.

The leveling switch apparatus is described and shown as directly driven by the movement of the car, by means of metal tapes 40 and 41. One end of the tape 40 is fastened to the car at the point 42, and its other end to the groove 5 by screw 43, and one end of the tape 41 is fastened to the counterweight 44 at the point 45, and the other end to the groove 6 by a screw 46. The tapes are so arranged on the sheave that as one tape winds up the other unwinds. In the drawing the grooves 5 and 6 and the members 21 and 22 are shown as being practically the same diameter; but the diameter of the drum might be smaller or larger than the grooves. The construction of the tape driving mechanism is more fully set forth in my application, Serial No. 607,244, filed December 15, 1922.

An up motion of the car will result in a clockwise rotation of the sheave 4, members 21 and 22 and shaft 1, as viewed from the right hand end of Figure 1. This direction of rotation of the shaft will cause the nut to travel towards the right hand as viewed in Figure 1. A down motion of the car will result in a counter-clockwise rotation of the sheave, members 21 and 22 and shaft, and the nut will travel towards the left hand. The travel of the nut is proportional to the movement of the car, the ratio of travel of the nut to the travel of the car depending upon the pitch of the thread on the shaft and the diameter of the grooves in the sheave. The principle of advancing the brush 10 slightly from point to point over the sections allows the sections to be spaced comparatively close together in the design and, consequently, the associated length of the sections taken together as a whole to be comparatively short, if preferred or desired, and also, of course, permits a shaft to be used of comparatively short length. Such a compact embodiment of my invention readily lends itself to installation in a convenient location, say for instance in the usual pent house for the elevator machine.

In Figure 1 the car is shown as level with the third floor. The car being at that position, the brush 10 of the nut is at the center of conducting section 14, the latter corresponding to the car leveling zone for the third floor. If the car were level with the fourth floor, for example, the brush 10 would be at the center of section 13, which section corresponds to the leveling zone for the fourth floor. In the cases of each and all floors, when the car is leveled with the floor, the member 10 will be on the conducting section corresponding to the leveling zone for the particular floor at which the car is stopped. It will be noted that when the car is at the third floor, the stationary contact brush 31 for the third floor is on the insulating part 19 on the drum, and not on either conducting member 21 or 22. When the car is, say at the fourth floor, the stationary brush 30 corresponding to the fourth floor is on the insulating part 19, and so as to the other floors at which the car is stopped.

The operation of the leveling switch apparatus will now be described. In Figure 1 a wiring diagram for five floors is shown, with the car at rest at the third floor landing; but, of course, the invention is applicable to two or more floors. The control system shown for the elevator is merely illustrative, as the particular type of control system used is immaterial. Let it be assumed that the car is shown as being at the third floor and is to stop at the fourth floor; the car switch lever 56 is thrown to the right to close the circuit to the up direction switch U as follows: from the plus main, by wire 57, contact 58, segment 59, contact 60 of the car switch, by wire 61, junction point 62, coil 63 of the up direction switch U, by wire 64, contacts 65 of the down direction switch D, by wire 66 to the minus main. The up direction switch U thereupon closes its contacts, thereby establishing a circuit including the motor armature 50, starting resistance 67, and series field winding 51, and a circuit including the brake winding 53, and the car begins to run in the up direction. The armature circuit extends from the plus line by wire 80, contact 81, bridge member 82 of switch U, contact 83, by wire 84, through armature 50, by wire 85, contact 86, bridge member 87 of switch U, by wire 88, through resistance 67 and series field 51 to the minus line. The brake circuit extends from the plus line by wire 80, contact 81, bridge member 82 of switch U, contact 89, by wire 90, brake magnet coil 53, by wire 91 to the minus line.

As the speed of the motor armature increases, the coil 54 of the accelerating switch is energized sufficiently to successively close its pairs of contacts 92, 93 and 94. This results in first short circuiting resistance 67 and then the series field 51 so that the motor armature is supplied with current at full line voltage. The elevator motor is then running at low speed with full shunt field. The circuit for the shunt field is as follows: from the plus main, by wire 80, shunt field 52, by wires 95 and 96, contacts 97 of the fast speed switch 55, by wire 91 to the minus line.

It will be noted that the lower one of the pair of contacts 69 is mechanically connected to and insulated from the lower one of the pair of contacts 94 so that the contacts 69 are closed at the same time as the contacts 94. Upon further movement of car switch lever 56 to bring segment 59 into engagement with contact 68, a circuit for the coil 70 of the fast speed switch 55 is established as follows: from the plus line, by wire 57, contact 58, segment 59, contact 68, by wire 98, contacts 69 (now closed), through coil 70 to the minus line. This causes the contacts 97 of the fast speed switch 55 to open, thereby inserting resistance 71 in series with the shunt field winding 52. The speed of the motor then increases to full speed.

The sheave 4, the members 21 and 22 and the shaft 1 are rotated in the meantime in a clockwise direction, and the nut 8 on the shaft with its brushes 9 and 10 travels in a direction from the left hand towards the right hand for this direction of travel of the car proportionally to the distance traveled by the car. As the circuit to the leveling switch apparatus is completed through the contacts 48 and 49 and the lever of the car switch when the latter is in its centered or off position, and as the lever of the car switch is not in contact with the contacts 48 and 49 at this time, there is no circuit completed at this time to the leveling switch apparatus. When the car is at the proper distance from the fourth floor the car switch lever is brought back to center in order to have the car stop at that floor. The centering of the car switch serves first, to break the circuit to the coil 70 of the fast speed switch 55, whereupon the car will be slowed down, and next, to effect the breaking of the circuit to the coil 63 of the up direction switch U, but if the car is in the leveling zone the brush 10 is on the section 13 for the fourth floor and the stationary brush 30 is on the up direction member 21 and as the car switch lever is now in engagement with contacts 48 and 49, a circuit is closed to the coil 63 which serves to keep that coil energized and the up direction switch closed, and the motor operates at slow speed since the circuit for the fast speed switch 55 is open. The circuit for the leveling switch apparatus is as follows: from the plus main, by wire 57, contact 58, by wire 72, contact 48, lever 56, contact 49 of the car switch, by wire 73, member 11, brush 9, nut 8, brush 10, contact 13, by wire 36, brush 30, segment 21, brush 23, ring 25, by wire 74, junction point 62, coil 63 of the up direction switch U, and then to the minus main as previously traced. The car continues to travel towards the fourth floor and when it is opposite thereto the conducting member 21 moves from under the brush 30 for that floor and the insulating part 19 moves under brush 30 and thereby breaks the circuit to the coil of the up direction switch U, and the car stops level with the floor. But if the car should coast by the floor, the member 22 moves into contact with the brush 30 for that floor and thereby closes at that point a circuit to the coil 75 of the down direction switch D as follows: from the plus main, by wire 57, contact 58, by wire 72, contact 48, lever 56, contact 49 of the car switch, by wire 73, conducting strip 11, brush 9, nut 8, brush 10, conducting section 13, by wire 36, brush 30, member 22, brush 24, ring 26, by wire 76, junction point 77, coil 75, by wire 78, contacts 79 of the up direction switch U, and by wire 66 to the minus main; and thereby the direction of the car is reversed and the car is brought back at slow speed and when it is opposite the floor the conducting member 22 moves out of contact with the brush 30 and the insulating part 19 moves into contact with the brush 30 and breaks the circuit to the coil 75 of the down direction switch D and the car comes to a stop level with the fourth floor. It is to be understood of course that the car switch is not to be thrown to center before the proper time to allow the car to reach the leveling zone in order that the leveling switch apparatus may come into action and take control of the car nor too late so that the car coasts by the leveling zone. If, however, the car switch is thrown to center too early or too late, as referred to, and the car stops short of, or coasts by, the leveling zone and stops, with the brush 10 on an insulating section 17, the car switch will have to be operated again to cause the car to be moved to the leveling zone, and whereupon, the car switch having been returned to center by that time, the control of the elevator is taken over by the leveling switch apparatus, and the car is leveled with the floor and stopped. A similar operation to that described above for operating the car from the third floor to, and leveling it with, the fourth floor applies to all of the other floors, both in the case of the car ascending or descending, and therefore it is unnecessary to describe the operation of the elevator for each and all of the floors by their numbers. It will be observed that when the car is being operated by the car switch the conducting members 21 and 22 and insulating part 19 as shown may revolve several times under the brush corresponding to the particular floor at which it is desired to stop before the car reaches the leveling zone for that floor. That arrangement is highly advantageous from the point of view of the size of the drum as it allows the drum to be used of comparatively small diameter, if preferred or desired, or where it is necessary to suit the size of the drum to the space allotted to it for its installation.

The leveling switch apparatus will also function to keep the car level with a desired landing as loads are put in it or taken off and the car sinks below or rises above its level with the floor from these causes, for as the car moves so also does the leveling switch apparatus move and when the insulating part 19 of the drum is moved from under the brush corresponding to the particular floor the car is opposite to and either member 21 or 22 moves into contact with that brush, a circuit is closed through the leveling switch apparatus to the proper direction switch, U or D, to cause the car to come back to a level with the floor, whereupon the insulating part 19 comes under the brush for the floor and the car is stopped level with the floor. It will be noted that in all cases the insulating part 19 is used to stop on, as stated above.

The invention is shown herein as applied to a direct current motor operated and controlled elevator, but it is obvious that it is useable with an alternating current motor operated and controlled elevator.

What I claim is:

1. An elevator car leveling apparatus comprising in combination with the car hoisting mechanism, a leveling switch mechanism adapted to control the hoisting mechanism to bring the car level with a landing, and a second switch mechanism establishing a leveling zone of predetermined length at said landing and operatively associated with said leveling switch mechanism for enabling the latter to perform its function within the established leveling zone.

2. An elevator car leveling apparatus comprising in combination with the car hoisting mechanism, a leveling switch mechanism actuated by the movement of the car and having up and down and stopping elements adapted to control the hoisting mechanism to raise or lower the car and stop it level with the landings, and a second switch mechanism establishing a leveling zone of predetermined length at each landing and operatively associated with said leveling switch mechanism for enabling the latter to perform its function within the established leveling zones.

3. An elevator car leveling apparatus comprising in combination with the car hoisting mechanism, a rotary leveling switch mechanism actuated by the movement of the car and having means adapted during one part of its rotation to cause the hoisting mechanism to raise the car and during another part of its rotation to cause the hoisting mechanism to lower the car, and at a definite point in its rotation to stop the car, and a second switch mechanism establishing a leveling zone of predetermined length at a landing and operatively associated with said rotary leveling switch mechanism for enabling the latter to perform its functions within the established leveling zone.

4. An elevator car leveling apparatus comprising in combination with the car hoisting mechanism, a leveling switch mechanism adapted to control the hoisting mechanism to bring the car level with the landings, and a second switch mechanism, operatively associated with said leveling switch mechanism having a plurality of elements corresponding with the landings and establishing leveling zones of predetermined length at the respective landings, and a member successively engaging said plurality of elements as the car travels through the hatchway, to enable the leveling switch to perform its function within the established leveling zones.

5. An elevator car leveling apparatus comprising in combination two members moving in unison with the car through different proportionate distances, the member moving through the shorter distance cooperating with a series of elements properly dimensioned and located to establish car leveling zones for the respective car landings, and the member moving through the greater distance cooperating with a series of elements in positions to correspond with the landings and constituting a direction control and stopping means, said moving members and their cooperating elements being inter-connected to enable the direction control and stopping means to be operated within any one of the car leveling zones to bring the car to rest at the landing within that zone.

6. In an elevator system, the combination of a car leveling switch apparatus, comprising switches having stationary and movable contact elements, certain of the movable elements being circularly, and the others rectilinearly, movable over the stationary elements, and means between the car and movable contact elements to move them over the stationary contact elements.

7. In an elevator car leveling switch apparatus, the combination of a switch comprising a traveling contact member, a stationary continuous contact member and a stationary contact member consisting of conducting sections separated from each other, the length of a section establishing the length of the leveling zone at a floor landing and means operable by the movement of the car for moving the traveling contact member along said conducting sections proportionally to the distance moved by the car.

8. In an elevator car leveling switch apparatus, the combination of a rotatable shaft, a switch having a stationary contact member comprising conducting sections establishing the car leveling zones at the floor landings and a traveling contact member on said shaft, and means for rotating the shaft by the movement of the car, whereby the traveling contact member is moved over the stationary member.

9. In an elevator car leveling switch apparatus, the combination of a switch comprising stationary and traveling contact members, the stationary member consisting of conducting sections insulated from each other and the length of each section establishing the length of the car leveling zone at a floor landing, and means to move the traveling contact member over the sections in accordance with the movement of the car, said means comprising a threaded rotary shaft and a nut on said shaft carrying said traveling contact member, and metal tapes connected to the car to drive said shaft.

10. In an elevator system, the combination of a car leveling switch apparatus comprising a switch having stationary and traveling contact members, the stationary member consisting of conducting contact sections insulated from each other, the length of each section establishing the length of the car leveling zone at a floor landing, means operable directly by the movement of the car to move the traveling contact member over said conducting sections proportionally to the distance traveled by the car in the leveling zones, a controller apparatus for the elevator motor and circuits connecting said switch and controller apparatus, whereby the car can be operated in the leveling zone of the desired floor landing by said leveling switch apparatus.

11. In an elevator system, the combination of a car leveling switch apparatus comprising a switch having stationary conducting contact members corresponding to the floor landings and a traveling conducting contact member adapted to be moved into and out of contact with said stationary members, a sheave for driving said traveling contact member and a metal tape connected to the car and sheave for rotating the sheave by the movement of the car.

12. In an elevator system, the combination of a car leveling switch apparatus comprising stationary conducting members corresponding to the floor landings and rotatable conducting members for the up and down direction of travel of the car, adapted to be moved into and out of contact with said stationary contact members, a sheave for rotating the rotatable contact members and metal tapes connected to the car for driving the sheave.

13. In an electric elevator system, the combination of a car leveling switch apparatus comprising a switch having stationary conducting members corresponding to the floor landings and conducting members adapted to be moved into and out of contact with said stationary members, a sheave for driving said traveling conducting members, means connected to the car for rotating said sheave by the movement of the car, a controller apparatus for the elevator motor, and circuits connecting said switch and controller apparatus, whereby the car can be controlled in the leveling zone of the desired floor by said leveling switch apparatus and stopped thereby level with the desired landing.

14. In an electric elevator system, the combination of a car leveling switch apparatus comprising a rotatable shaft, a nut traveling on the shaft and having conducting contact members, stationary conducting contact members engageable by said contact members of the nut, one of said stationary members consisting of insulated conducting contact sections establishing car leveling zones, a switch rotatable by the shaft and adapted to stop the car in the leveling zones, a controller apparatus for the motor, conductors between said stationary contact members, rotary switch and the controller apparatus, and means connected to the car for rotating the shaft.

15. In an elevator system, the combination of a rotatable threaded shaft, a nut traveling on the shaft and having conducting contact members, stationary conducting contact members engaging said contact members of the nut, one of said stationary members comprising insulated conducting contact sections, each section establishing a car leveling zone at a landing, the distance between the centers of said sections corresponding proportionally to the distance traveled by the car between respective landings, and means connected to the car for rotating the shaft to cause the contact members of the nut to travel over said stationary conducting sections.

16. In an electric elevator system, a car leveling switch apparatus comprising the combination of a rotatable shaft, a switch having stationary conducting contact members corresponding in position to the floor landings for the car, and conducting contact segments for the up and down directions of car travel respectively, spaced apart from each other and adapted to be driven by said shaft in contact with said stationary members, another switch comprising contact members, one of said members divided into conducting sections insulated from each other and establishing the car leveling zones, a traveling nut on said shaft movable over said last mentioned members by rotating the shaft, a motor controlling apparatus, circuits between said switches and controlling apparatus, and means connected to the car for rotating the shaft, whereby the car is automatically leveled with the floor landings.

17. In an elevator system, the combination of a car leveling switch apparatus comprising two switches each having stationary and traveling conducting contact members, the stationary members of one switch establishing the leveling zones and the stationary members of the other switch corresponding in position to the floor stops for the car level with the landings, the traveling contact member for the stationary members corresponding to the floor stops of the car comprising two conducting segments for up and down direction of car travel respectively with their adjacent ends insulated from each other, means connected to the car for moving the traveling contact members a distance proportional to the distance traveled by the car, a car switch, a controlling apparatus having up and down car travel direction switches, circuits between the car switch, controlling apparatus direction switches, and switches of the car leveling switch apparatus, whereby during the time the elevator is controlled by the car switch, said segments may be rotated on and off of said stationary members for the car stops at the various landings without affecting the operation of the car.

18. An elevator car leveling switch apparatus, comprising the combination of two series of switch elements and their co-operating members, the elements of one series establishing car leveling zones for the respective landings and the elements of the other series constituting floor stops within the respective leveling zones, movable means for operating said switches, and connections between said movable means and the car, whereby the movement of the car in the leveling zone operates said switches to level the car with the floors.

19. An elevator car leveling switch apparatus, comprising in combination a series of spaced electrical contact members, one for each floor, a brush adapted to travel over said contact members, a drum having a pair of conductors, insulated from each other, on its periphery, and a series of stationary brushes, one for each floor, in contact with the periphery of said drum, and conductor wires connecting said spaced contact members and stationary brushes.

20. An elevator car leveling switch apparatus, comprising the combination of a series of electrical contact sections spaced apart from each other, one for each floor, a traveling brush and means to move said brush a comparatively short distance in moving over said contact members, a drum having on its periphery a pair of conductors insulated from each other, a series of stationary brushes, one for each floor in contact with the periphery of the drum, and means to rotate the periphery of the drum a comparatively long distance during the travel of the car, and conductor wires connecting the contact members and stationary brushes.

In testimony whereof, I have signed my name to this specification.

EDWARD L. DUNN.